US010868759B2

(12) United States Patent
Vanacken et al.

(10) Patent No.: US 10,868,759 B2
(45) Date of Patent: Dec. 15, 2020

(54) SYSTEM AND METHOD FOR VIRTUAL MACHINE PORT TRANSLATION AND DYNAMIC ROUTING

(71) Applicant: Selligent, S.A., Braine-l'Alleud (BE)

(72) Inventors: Lode Vanacken, Braine-l'Alleud (BE); Rob Bertels, Braine-l'Alleud (BE)

(73) Assignee: Selligent, S.A., Braine-l' Alleud (BE)

( * ) Notice: Subject to any disclaimer, the term of this patent is extended or adjusted under 35 U.S.C. 154(b) by 0 days.

(21) Appl. No.: 16/402,019

(22) Filed: May 2, 2019

(65) Prior Publication Data

US 2019/0342210 A1 Nov. 7, 2019

Related U.S. Application Data

(60) Provisional application No. 62/666,176, filed on May 3, 2018.

(51) Int. Cl.
*H04L 12/28* (2006.01)
*H04L 12/715* (2013.01)
(Continued)

(52) U.S. Cl.
CPC .......... *H04L 45/64* (2013.01); *G06F 9/45558* (2013.01); *H04L 45/74* (2013.01);
(Continued)

(58) Field of Classification Search
USPC ....... 370/229, 230, 235, 237, 252, 351, 355, 370/389, 392, 399, 395.3, 401, 474, 475
See application file for complete search history.

(56) References Cited

U.S. PATENT DOCUMENTS 7,093,018 B1 * 8/2006 Sievers ............. H04L 29/12009
709/217
9,497,023 B1 * 11/2016 Allen .................. H04L 63/0478
(Continued)

OTHER PUBLICATIONS

PCT/EP2019/061396, International Search Report (PCT/ISA/210 and PCT/ISA/220) dated Jun. 27, 2019, enclosing Written Opinion of the International Searching Authority (PCT/ISA/237) (Thirteen (13) pages).

(Continued)

*Primary Examiner* — Nguyen H Ngo
(74) *Attorney, Agent, or Firm* — Crowell & Moring LLP

(57) ABSTRACT

A system for virtual machine port translation and dynamic routing of a network includes at least one processor, which executes stored instructions to perform a method for virtual machine port translation and dynamic routing of a network. One or more virtual machines are provided, each virtual machine having at least one internal IP address that is routable or assignable to one or more external IP addresses. One or more thresholds are set for each of the external IP addresses based on a policy or constraint set forth by a service provider. An analysis is performed on a connection state of the network. It is determined, based on the analysis, whether any of the external IP addresses meet or exceed the set thresholds. Based on the determination, a routing operation is selected and performed from among the following set of routing operations: dynamically route an internal IP address of a respective virtual machine to a different external IP address than an external IP address currently assigned thereto, and defer the dynamic routing.

19 Claims, 6 Drawing Sheets

(51) Int. Cl.
 G06F 9/455 (2018.01)
 H04L 12/741 (2013.01)
 H04L 29/12 (2006.01)
(52) U.S. Cl.
 CPC ...... *H04L 61/2514* (2013.01); *H04L 61/2517* (2013.01); *G06F 2009/45595* (2013.01)

(56) References Cited

U.S. PATENT DOCUMENTS

| | | | | |
|---|---|---|---|---|
| 9,667,595 | B2* | 5/2017 | Ossipov | H04L 43/0811 |
| 2009/0296721 | A1* | 12/2009 | Zhang | H04L 12/4633 370/401 |
| 2010/0082800 | A1 | 4/2010 | Wei et al. | |
| 2013/0031000 | A1* | 1/2013 | Morris | G06F 21/41 705/44 |
| 2016/0050224 | A1* | 2/2016 | Ricafort | H04L 63/1425 726/23 |
| 2016/0205054 | A1* | 7/2016 | Lu | H04L 51/14 709/206 |
| 2017/0353429 | A1* | 12/2017 | Le Rouzic | H04L 65/1073 |
| 2019/0058725 | A1* | 2/2019 | Kraning | H04L 43/16 |

OTHER PUBLICATIONS

Razvan Bocu, "IP Pooling-Based Email Systems Reputation Assurance", ROEDUNET International Conference (ROEDUNET), 2011, 10th IEEE, Jun. 23, 2011, pp. 1-6, XP032039596.

Brett Watson, "Beyond Identity: Addressing Problems that Persist in an Electronic Mail System with Reliable Sender Identification", Jan. 1, 2004, XP055597136, URL:https://pdfs.semanticscholar.org/5326/184704717af5d75f3c27bfe5585adff557d0.pdf, 8 total pages.

Zhao Xianghui et al., "Statistical-based Bayesian Algorithm for Effective Email Classification", 2016 3rd International Conference on Information Science and Control Engineering (ICISCE), IEEE, Jul. 8, 2016, pp. 636-639, XP032993369.

Srisuresh et al., "IP Network Address Translator (NAT) Terminology and Considerations", Internet Engineering Task Force, Standard, Internet Society (ISOC), Geneva, Switzerland, Aug. 1, 1999, XP015008446, 32 total pages.

* cited by examiner

300

| Internal port | External IP address | Destination port |
|---|---|---|
| 1001 | 195.21.37.217 | 80 |
| 1002 | 195.21.37.218 | 80 |
| 1003 | 195.21.37.219 | 80 |
| 1004 | 195.21.37.220 | 80 |

400

| External IP address | Target IP address | Messages Delivered | Machine |
|---|---|---|---|
| 195.21.37.217 | 104.47.37.33 | 140 | VM1 |
| 195.21.37.217 | 104.47.37.33 | 120 | VM1 |
| 195.21.37.217 | 104.47.37.33 | 80 | VM2 |
| 195.21.37.217 | 104.47.37.33 | 240 | VM1 |
| 195.21.37.219 | 104.47.37.33 | 5 | VM1 |

500

| External IP address | Remote IP address | Partition / Virtual Machine |
|---|---|---|
| 195.21.37.217 | 104.47.8.33 - Microsoft | 0 |
| 195.21.37.217 | 173.194.66.26 - Google | 1 |
| 195.21.37.217 | 66.218.85.139 - Yahoo | 0 |
| 195.21.37.217 | 17.142.163.10 - Apple | 1 |

400

SYSTEM AND METHOD FOR VIRTUAL MACHINE PORT TRANSLATION AND DYNAMIC ROUTING

CROSS REFERENCE TO RELATED APPLICATIONS

This application claims priority under 35 U.S.C. § 119 to U.S. Provisional Application No. 62/666,176, filed on May 3, 2018, the entire disclosures of which are herein expressly incorporated by reference.

BACKGROUND OF THE INVENTION

The invention relates to virtual-machine-based port translation and the dynamic routing of an internal IP address of a virtual machine to one or more external IP addresses for connection to a service.

For many services, such as publicly accessible services (e.g., e-mail services), an Internet Protocol (IP) address of a calling or requesting client is an important operational factor. An IP address associated with the client can be used to determine various things, such as if the client is allowed access to the service (e.g., whitelisting, blacklisting), quality of service (e.g., for reputation based systems), and/or returned content (e.g., for location based services). An application that requires connection to and communication with such publicly accessible services may find it very important to control various metrics related to the IP addresses. And depending on various factors, it may be desirable to perform the calls or requests to the service using a single, whitelisted IP address or multiple IP addresses.

When scaling out an application, a common solution is to implement one or more virtual machines. Internal or local IP addresses of these virtual machines can be assigned one or more external IP addresses to connect to the publicly available service, which may consider each external IP address as a distinct client. As shown in FIG. 1, for example, virtual machine A has two different external IP addresses, 195.21.37.217 and 195.21.37.218, assigned to it in order to connect to and communicate with the publicly accessible service. Similarly, virtual machine B also has two different external IP addresses, 195.21.37.219 and 195.21.37.220, assigned to it.

The dashed lines in FIG. 1 illustrate the connection of each of the four different external IP addresses to a particular address, 104.47.37.33:80, associated with the service.

One disadvantage of such an approach is that it creates a "hard" coupling between the internal IP address of the virtual machine and the one or more available external IP addresses. To that end, only the external IP addresses assigned to the virtual machine can be used by the virtual machine. Thus, virtual machine A in FIG. 1 can only use IP addresses 195.21.37.217 and 195.21.37.218, but virtual machine A cannot use IP addresses 195.21.37.219 and 195.21.37.220 that are assigned to virtual machine B.

Accordingly, there is a need for the internal IP address of each virtual machine to have access to every available external IP address, as well as a need to dynamically determine, route, and/or assign the internal IP address with an appropriate external IP address, so as to at least increase overall scalability and flexibility of the application.

SUMMARY OF THE INVENTION

According to one or more embodiments, the present invention involves mapping, via a proxy, a reverse proxy, or any other means to route traffic in a virtual network (e.g., firewall), the internal IP address of a virtual machine to one or more external IP addresses, thereby effectively removing the "hard" coupling between the internal or local IP address of a virtual machine and one or more external IP addresses so that each and every virtual machine has access and be assigned to every available external IP address. Moreover, a dedicated routing service may keep track of and analyze various metrics associated with each of the external IP addresses, and the routing service may, for example, instruct a virtual machine which route to use (e.g., which static port to use) for a specific timeframe (where after such timeframe, the virtual machine may request new routes), thereby dynamically routing the internal IP addresses of the virtual machines to optimal external IP address(es) (which are mapped to different static ports).

Further objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

DETAILED DESCRIPTION OF THE DRAWINGS

Figure 1:
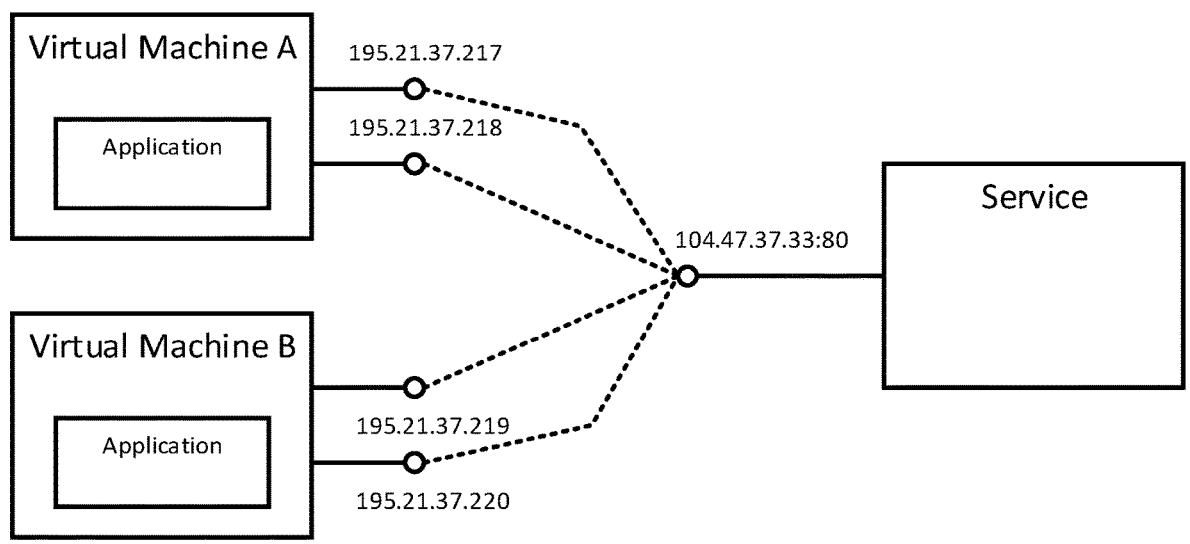
FIG. 1 illustrates an example schematic of IP addresses that are hard coupled to their respective virtual machines.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail.

The present invention relates to at least a system and method for virtual-machine-based port translation and the dynamic routing of an internal IP address of a virtual machine to one or more external IP addresses for connection to a service, such as a publicly available service (e.g., electronic mail service). In contrast to the configuration shown in FIG. 1, the present invention removes the "hard" coupling between a virtual machine and the one or more external IP addresses via a firewall so that each and every virtual machine has access and be assigned to every available external IP address.

As will be further described below, the proxy, reverse proxy, or any means to route traffic in the virtual network, such as a firewall, may map the internal IP address of the virtual machine to one or more external IP addresses. Moreover, a dedicated routing service may keep track of and analyze various metrics associated with each of the external IP addresses, and the routing service may, for example, instruct a virtual machine which route to use (e.g., which static port to use) for a specific timeframe (where after such timeframe, the virtual machine may request new routes), thereby dynamically routing the internal IP addresses of the virtual machines to optimal external IP address(es) (which are mapped to different static ports).

Figure 2:
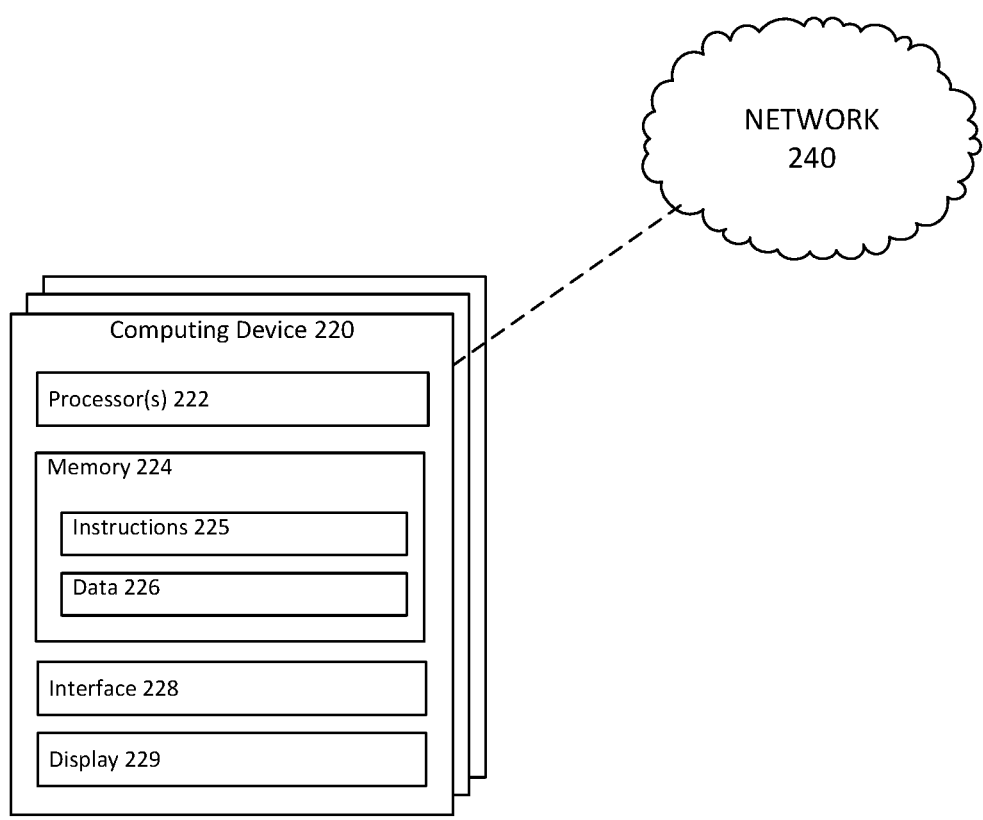
FIG. 2 illustrates an example system in accordance with one or more aspects of the invention.

FIG. 2 illustrates an example system 200 in accordance with one or more aspects of the present invention. The system 200 includes at least one computer computing device 220 that is connected to a network 240, as shown by the dashed line. It may be understood that a plurality of computing devices, not just one computing device, may be included in the system 200, as indicated by the cascaded boxes illustrated behind computing device 220.

For example, as shown in FIG. 2, computing device 220 may include one or more processors 222, memory 224, e.g., permanent or flash memory (which includes instructions 225 and data 226), an interface 228, and a display 229. The computing device 220 (and optionally, the additional computing devices) may be configured to run, implement, and/or execute one or more virtual machines.

A virtual machine may be a computer file (e.g., an "image") that runs in a graphical interface (e.g., a window) like any other computer program and behaves like an actual computer, giving a user the same or similar experience as the user would have on the computing device 220. Moreover, the virtual machine may run one or more applications. It may be understood that the virtual machine may be configured similarly to any conventional virtual machine and its corresponding functionalities, and it may be further understood that computing device 220 may run multiple virtual machines simultaneously, or alternatively, may run one virtual machine while each of the other additional computing devices runs respective virtual machines in unison.

As set forth above, computing device 220 includes at least one processor 222. Processor 222 may instruct the various components of the computing device 220 to perform tasks based on the processing of certain information, such as instructions 225 and/or data 226 stored in memory 224. Processor 222 may be any standard processor, such as a central processing unit (CPU), or may be a dedicated processor, such as an application-specific integrated circuit (ASIC) or a field programmable gate array (FPGA) or an industrial process controller.

Memory 224 may be any type of hardware (e.g., ROM, RAM, CD-ROM, hard drive, write-capable, read-only, etc.) configured to store information accessible by the processor 222, such as instructions 225 and data 226, which can be executed, retrieved, manipulated, and/or stored by the processor 222. The instructions 225 stored in memory 224 may include any set of instructions (e.g., "steps" or "algorithm" associated with software) that can be executed directly or indirectly by the processor 222. The data 226 stored in memory 224 may be retrieved, stored or modified by the processor 222, for example, in accordance with the instructions 225.

Interface 228 may be any device used for interfacing with the computing device 222 (e.g., keyboard, mouse, touch sensitive screen, camera, microphone, etc.), a connection or port (e.g., data port, USB, zip drive, card reader, CD driver, DVD drive, etc.), a network interface for providing the computing device 222 connection over network 240, and/or software (e.g., graphical user interface) that allows the reception of information and data. Display 229 may be any suitable type of device capable of communicating data to a user, such as liquid-crystal display (LCD), light emitting diode (LED), plasma screens, etc.

Network 240 may be any suitable type of network, wired or wireless, configured to facilitate the transmission of data, instructions, etc. to other system components located in other external networks. For example, network 240 may be a local area network (LAN) (e.g., Ethernet or other IEEE 802.03 LAN technologies), Wi-Fi (e.g., IEEE 802.11 standards), wide area network (WAN), virtual private network (VPN), global area network (GAN), or any combinations thereof, and the network 240 may connect computing device 220 to the Internet and/or to server computers running publicly accessible services (e.g., e-mail services, e-commerce services, conferencing services, video services, etc.) over the Internet or any other suitable outside network.

Figures 3, 4, 5:
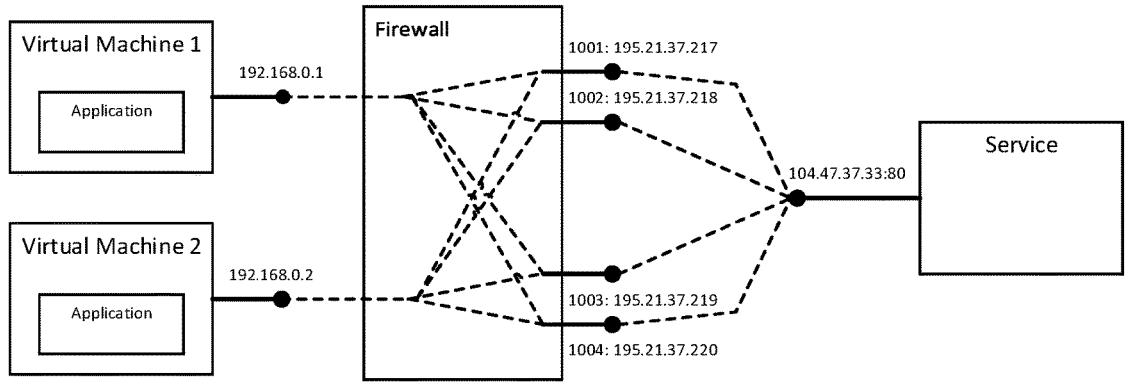
FIG. 3 illustrates an example of virtual-machine-based port translation using a firewall in accordance with one or more aspects of the invention.
FIG. 4 illustrates an example mapping table in accordance with one or more aspects of the invention.
FIG. 5 illustrates an example connection state table in accordance with one or more aspects of the invention.

FIG. 3 illustrates virtual-machine-based port translation 300 in accordance with one or more aspects of the present invention. By way of example, there are two virtual machines, virtual machine 1 and virtual machine 2, each running a respective application, as shown. Virtual machine 1 has an internal or local IP address, 192.168.0.1. Similarly, virtual machine 2 has an internal or local IP address, 192.168.0.2. It may be understood that unique IP addresses can be assigned to every network interface that a device has, whether the device is a virtual interface or a physical interface. To at least that end, virtual machines may have virtual network interface controller (NIC) and IPs, which means that each virtual machine has at least one unique internal or local IP address (depending on how many network interfaces the virtual machine has) assigned thereto, such as IP addresses of 192.168.0.1 and 192.168.0.2 of virtual machines 1 and 2, respectively, as described above.

FIG. 3 also shows a firewall that can route and/or assign an internal IP address of a virtual machine (virtual machine 1 or 2) to any one of the four available external IP addresses, 195.21.37.217, 195.21.37.218, 195.21.37.219, and 195.21.37.220, which can be used to access the service downstream. In at least that regard, virtual machine 1 and virtual machine 2 has access to every external IP address available, and the firewall effectively decouples or disconnects any "hard" connection between the internal IP address of each virtual machine and the external IP addresses.

In one embodiment, the firewall is configured to map the internal address of a virtual machine to one or more external IP addresses by using, for example, a redundant part of the connection (e.g., a static port): the destination port, or the port of the service, such as port 80 corresponding to HTTP traffic or any other suitable port (e.g., port 25). Thus, with every outbound connection using the same port, it can be replaced with a number identifying the external IP address to use.

FIG. 4 illustrates a mapping table for HTTP traffic (e.g., port 80) in accordance with one or more aspects of the present invention. As shown, the left and middle columns represent the internal port number and the respective external IP address associated with that port number. And the right column indicates the destination port for the external IP address, which in this example is port 80. To that end, for example, any virtual machine opening a connection to address 104.47.37.33:1003 would result in a connection from 195.21.37.219 to 104.47.37.33:80 (see FIG. 3 for reference). Similarly, a virtual machine opening a connection to address 104.47.37.33:1001 results in a connection from 195.21.37.217 to 104.47.37.33:80; a virtual machine opening a connection to address 104.47.37.33:1002 results in a connection from 195.21.37.218 to 104.47.37.33:80; and a virtual machine opening a connection to address 104.47.37.33:1004 results in a connection from 195.21.37.220 to 104.47.37.33:80.

The above example of virtual machine port translation with respect to FIGS. 3 and 4 may be applied in the context of electronic mail transmission and communication with e-mail services. It may be common for e-mail providers to use a reputation of an IP address to provide better quality of service. The service providers may define various policies that put constraints on certain aspects of the e-mail delivery process. For instance, limits can be placed on the number of connections made concurrently and/or on the maximum number of e-mails that may be delivered within a particular timeframe (e.g., an hour). Particularly, these limits may be set for each individual IP address. Adhering to the policies and constraints may increase the reputation of the IP address, and as a result, may ultimately raise thresholds, which allows e-mails to be delivered more efficiently, rapidly, and at greater volumes.

Scaling can be achieved by adding more IP addresses and/or virtual machines. Because of the policies and the unique constraints that may be set by the e-mail providers, however, various metrics associated with each of the IP addresses connected to the e-mail service may be recorded, maintained, updated, processed, and/or analyzed, and dynamically determine, based on those metrics, how to best manage, route, and/or assign the internal IP address of each virtual machine to the appropriate external IP address in order to adhere to the policies and constraints set by the e-mail provider and further optimize usage of the available external IP addresses.

In an embodiment, a routing service may maintain all the connection states of the network and dynamically determine optimal ways to connect the local IP addresses of the virtual machines and the external IP addresses available.

FIG. 5 illustrates a table 500 containing the connection states of the network in accordance with one or more aspects of the present invention. For example, table 500 may include four columns and corresponding rows containing various information, data, and/or metrics associated with each of the external IP addresses. As shown, the left-most column identifies the external IP addresses, the column to the right of the left-most column includes the target IP addresses associated with the external IP addresses, the right-most column identifies the virtual machine sending the messages, and the column to the left of the right-most column indicates the number of messages delivered. For example, the first row of table 500 indicates that virtual machine 1 has delivered 140 messages from external IP address 195.21.37.217 to target IP address 104.47.37.33. The second row indicates similar information except that the number of delivered messages (120 messages) is different. The third row also indicates similar information, but the virtual machine (virtual machine 2) and how many messages it delivered (80) is different.

It may be understood that table 500 shown in FIG. 5 is only an example and is not limited thereto. For some applications, the only required columns in table 500 may be the external IP address and the target IP address columns when, for instance, the amount or number of connections is the only relevant metric. Additional metrics may be added to the table based on different context(s) in which they are used, such as messages delivered for Simple Mail Transfer Protocol (SMTP). For example, an additional column indicating time (or any data related to time) may be added, which may be used to calculate a rate of delivery of the messages.

Information, data, metrics, etc. corresponding to the connection states of the network may be generated and/or updated in real-time. By way of example, a single table (stored in memory) may be updated in real-time by the routing service, for instance, when a connection is requested or completed. Alternatively, it may be understood that more than one chart (also stored in memory) may suitably be generated and/or updated.

Using the information, data, metrics, etc. of the connection states, the routing service may dynamically determine how to optimally route and/or assign the virtual machines to the external IP addresses in order to maintain the various policies and constraints set by the e-mail service. For example, the e-mail service provider may set forth a policy or constraint that a single IP address cannot exceed 600 messages per hour. Based on these types of policies or constraints, various thresholds may be set so that the policies or constraints are not violated. It may be understood that the predetermined threshold number may be a number lower than the actual threshold constraint set by the e-mail service provider so that the network never exceeds such constraint.

A routing procedure may be performed if a predetermined threshold is met or exceeded. For example, based on the 600 message policy above, a threshold of 500 messages per hour timeframe may be set for each external IP address so that a routing procedure may be implemented if an external IP address meets or exceeds that threshold.

In one embodiment, FIG. 5 may represent the connection states of the external IP addresses 30 minutes into a one hour timeframe. As shown, virtual machine 1 has delivered 500 messages from external IP address 195.21.37.217 to target IP address 104.47.37.33 in those 30 minutes and may well exceed 600 messages within the allotted hour timeframe. Thus, the routing service may determine that external IP address 195.21.37.217 has met or exceeded the predetermined threshold value of 500 messages per hour timeframe and initiate dynamic routing, examples of which are further described below.

Referring back to FIG. 3, the routing service (which may be implemented via the proxy, reverse proxy, firewall, etc.) may effectively "re-route" or assign the internal IP address of virtual machine 1 to any other external IP address (e.g., 195.21.37.218, 195.21.37.219, 195.21.37.220) given that those IP addresses meet at least the predetermined threshold requirements. For example, the routing service may determine that external IP address 195.21.37.219 has been minimally utilized by virtual machine 1 in the hour timeframe, as shown in FIG. 5. The routing service may thus instruct virtual machine 1 which static port to use while executing and communicating with the external service, thereby inherently changing the routing. For example, the routing service can choose external IP address 195.21.37.219, which is mapped to port 1003, and instructs to connect to 104.47.37.33:1003, thereby re-routing or assigning the internal IP address of virtual machine 1 to external address 195.21.37.219.

Figures 8, 9:
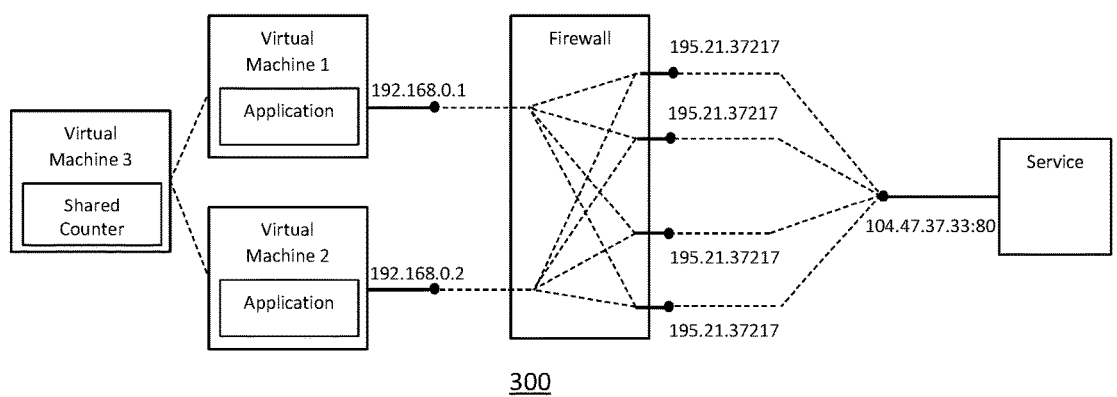
FIG. 8 illustrates an example of virtual-machine-based port translation in which a bottleneck situation occurs.
FIG. 9 illustrates an exemplary partitioning in accordance with the embodiment.

If an external IP address is used on a single virtual machine, a local memory counter may manage and/or keep track of whether the external IP address associated with the virtual machine has met (or is meeting) one or more thresholds associated with the remote IP address. However, such counters are increasingly difficult to manage, when external IP addresses are shared over multiple virtual machines, and this may lead to a bottleneck situation, as shown in FIG. 8.

Accordingly, in at least one embodiment, a counter may be held for each pair of an external IP address and a remote IP address. The counter may be held in a local memory of an associated virtual machine, or in the local memory of a designated virtual machine (such as virtual machine 3). In order to minimize or avoid the bottleneck situation of FIG. 8, it is preferable that each associated virtual machine (e.g., virtual machines 1 and 2) include its own local counter.

The routing procedure may be such that, for every such pair, the pair is routed through the same virtual machine, respectively. In order to achieve this routing, a service (e.g., email) workload may be partitioned among all the virtual machines in accordance with the following function:

$$\text{partition} = H(\text{LocalIP} * \text{RemoteIP}) \bmod n,$$

where H is a consistent hashtag function whose result is projected over the total number of virtual machines n. Using this partitioning logic, large workloads may be distributed among many virtual machines with just a single external IP address.

FIG. 9 illustrates a table 800 showing an exemplary partitioning in accordance with the embodiment. Where external IP address 195.21.37.217 and remote IP address 104.47.8.33 form a first pair, the routing is via virtual machine 0. Where external IP address 195.21.217 and remote IP address 173.194.66.23 form a second pair, the routing is via virtual machine 1.

In this manner, the each external IP address may be used on as many virtual machines as there are variable remote IP addresses.

Figure 6A:
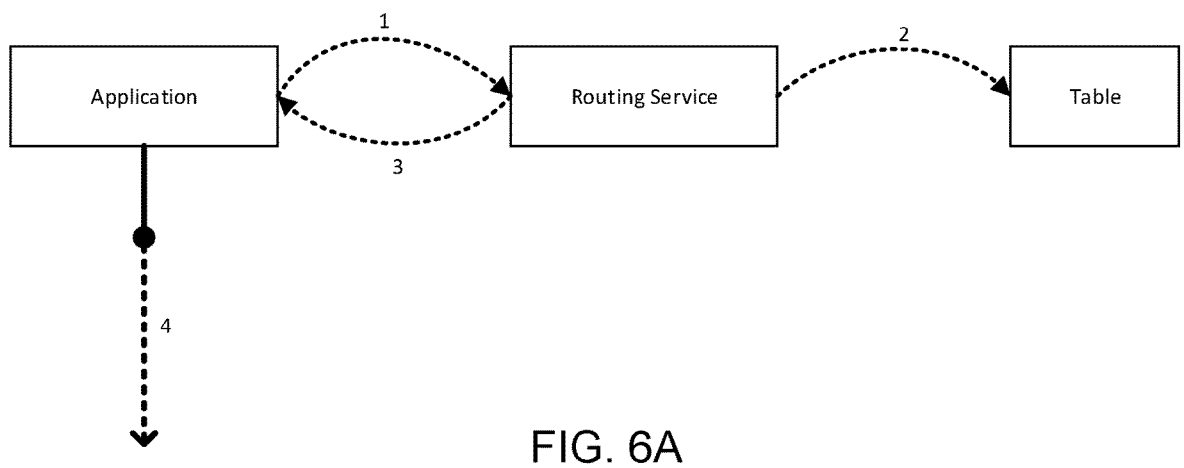
FIGS. 6A and 6B illustrate example diagram of setting up a connection and closing a connection, respectively, in accordance with one or more aspects of the invention.

FIG. 6A illustrates an example connection setup in accordance with one or more aspects of the present invention. In step 1, the application (executed by one or more virtual machines, such as virtual machines 1 and 2 of FIG. 3) is to be connected to an external service (e.g., HTTP service) running on endpoint 104.47.37.33:80. The application may request the routing service to provide it the best route. In step 2, the routing service consults its internal state (e.g., table 500 of FIG. 5) and determines the best external IP address to use based on current data and metrics. For example, the routing service may choose external IP address 195.21.37.218, which is mapped to static port 1002. The chosen endpoint may be then added to the internal state (e.g. table 500) as an active connection. In step 3, the routing service instructs the application to connect to 104.47.37.33:1002. In step 4, the application connects to the provided endpoint.

Figure 6B:
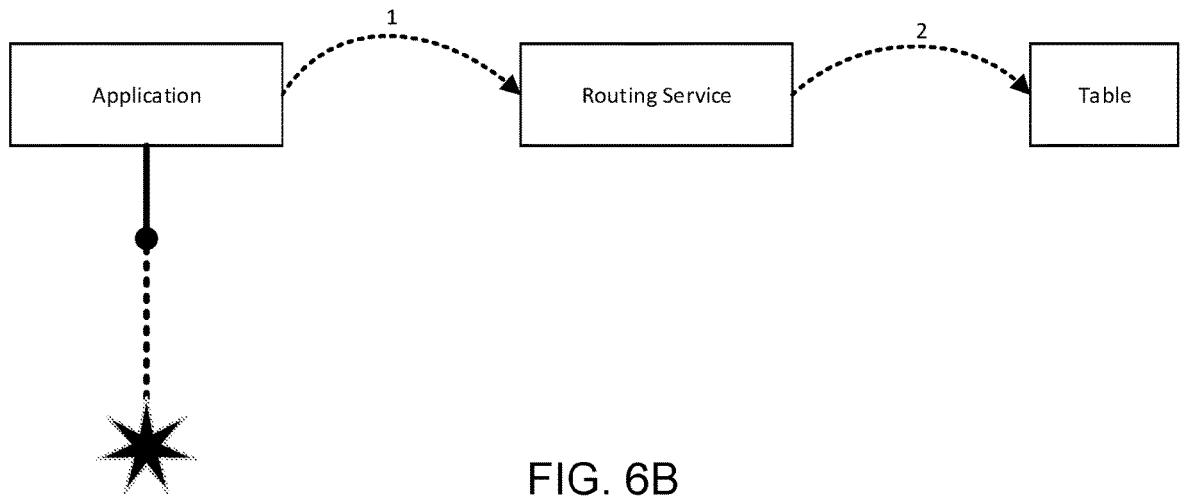

FIG. 6B illustrates an example connection closing in accordance with one or more aspects of the present invention. In step 1, when an application closes a connection (whether by choice or not), the application informs the routing service of the connection closing. In step 2, the routing service updates the active connection state and sets the metrics of the completed connection in the internal state (e.g., table 500).

It may be understood that e-mail service is only an example and that all sorts of policies and/or constraints set by various service providers may be the basis for the dynamic routing procedures.

Figure 7:
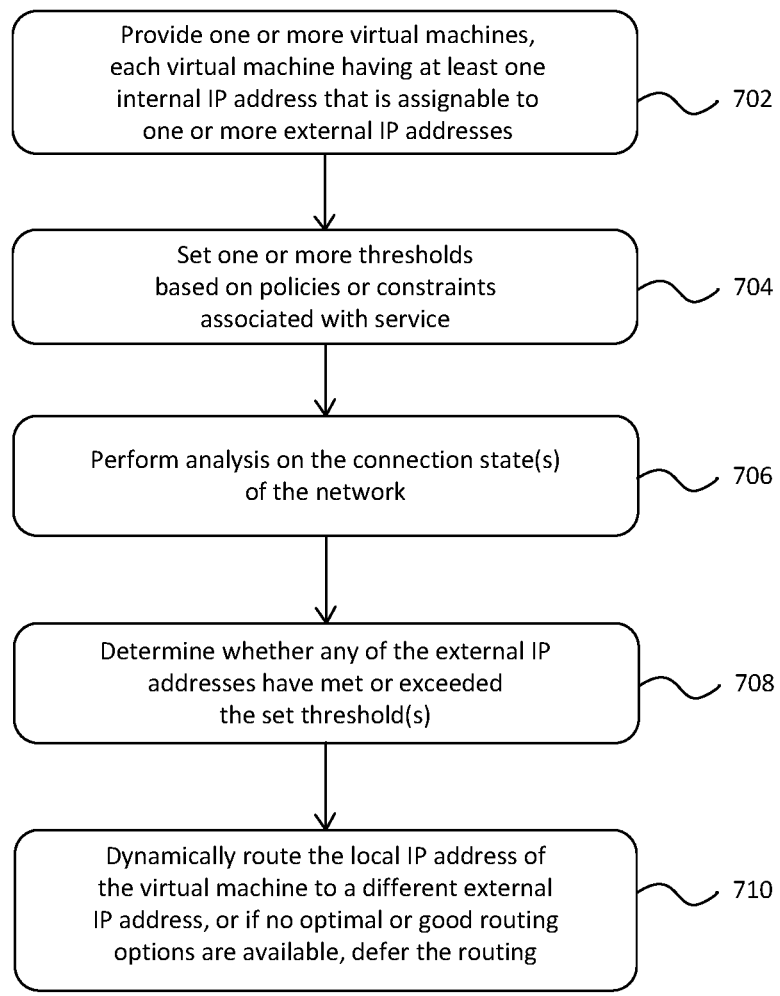
FIG. 7 illustrates an example flow chart in accordance with one or more aspects of the invention.

FIG. 7 illustrates an example flow diagram 700 of port translation and dynamic routing in accordance with one or more aspects of the present invention, as described above. The one or more steps of FIG. 7, as may be understood, can be carried out by any one or more computing devices, such as computing device 220 of FIG. 1. It may be understood that the one or more steps in FIG. 7 and described below can be performed in any order and/or simultaneously, and are not limited to any specific sequence.

In step 702, one or more virtual machines may be provided (collectively to execute an application), which may be configured to communicate with an external service, such as an e-mail service provider, via one or more external IP addresses. As discussed above, the one or more virtual machines may each have at least one internal or local IP address that is assignable to the one or more external IP addresses.

In step 704, one or more thresholds may be set for each external IP address based on various policies or constraints that are set forth by the service provider to which the virtual machines are connected to. As described above, some e-mail service providers may limit the number of messages sent from one IP address to a particular number per timeframe. Based on this, a threshold that is slightly lower than the service constraint may be set for the IP addresses so that the constraint is never exceeded.

In step 706, analysis may be performed on the connection states of the network and various types of data and metrics associated with the external IP addresses may be obtained, such as, the number of messages being sent from a particular external IP address, the timeframe in which those messages were sent, timestamps for each sent message, which virtual machines (and/or respective internal IP addresses) are doing the sending, destination IP address, rate of delivery of specific messages, etc. As described above, data and metrics of the connection states of the network may be updated in real-time.

In step 708, it is determined whether any of the external IP addresses have met or exceeded the thresholds that have been set, for example, in step 704. Additionally or alternatively, thresholds can be set contemporaneously as the connection states are being analyzed, or the like.

In step 710, if thresholds have been met or exceeded, it may be determined from which location the bulk of the messages being sent via the external IP address may be originating from. To that end, for example, the local IP addresses associated with a particular virtual machine may be routed or assigned to a different external IP address that may be able to accommodate more messages, thereby diverting the messages that cause one external IP address to meet or exceed its threshold to a different IP address. As described above, this may be done by the routing service instructing the virtual machine which static port to use (where the external IP addresses are mapped to various static ports). However, if there are no good or optimal routing options are available, the routing service may defer or postpone the routing.

The present invention is advantageous in various ways. For example, the present invention allows a system to achieve greater scalability (e.g., to scale more and more virtual machines) and flexibility by way of virtual machines and port translation while being able to appropriately maintain the reputation (e.g., reputation score) of each external IP address used by the virtual machines of the system, the reputation which may be extremely important for services, such as e-mail services, that rely on and use such reputation. Moreover, the present invention is advantageous for at least the reason that the routing of an internal IP address of a virtual machine to one or more external IP addresses is dynamic based on the measured metrics and the set threshold associated with the external IP addresses.

It may be understood that the present invention may be applied to and advantageous for systems or tools beyond the e-mail example(s) described above. For instance, systems that implement technologies such as web scraping tools, web harvesting, or web data extraction to extract various data from websites use static ports (e.g., port 80) and may implement virtual machines that use one or more external IP address to connect to the various websites, and thus, require that the reputation of the IP address be positively maintained, especially if the websites, like the e-mail services, set forth various policies or constraints.

The enablements described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

What is claimed is:

1. A system for virtual machine port translation and dynamic routing of a network, the system comprising:

at least one processor, which executes stored instructions to:
provide a plurality of virtual machines, each virtual machine having an internal IP address that is routable or assignable to one or more external IP addresses shared between the internal IP addresses of the virtual machines;
set one or more thresholds for each of the external IP addresses based on a policy or constraint set forth by an e-mail service provider, wherein each threshold is a particular number of messages per timeframe;
perform analysis on a connection state of the network;
determine, based on the analysis, whether any of the external IP addresses meet or exceed the set thresholds; and
based on the determination, perform a routing operation selected from among the following set of routing operations:
dynamically route the internal IP address of a respective virtual machine to a different external IP address than an external IP address currently assigned thereto, and
defer the dynamic routing.

2. The system of claim 1, wherein the dynamic routing is performed via a firewall, a proxy server, or a reverse proxy server.

3. The system of claim 1, wherein the one or more external IP addresses are connectable to an external network so as to access downstream services of the e-mail service provider.

4. The system of claim 1, wherein the set of routing operations further includes:
decoupling the internal IP address of the respective virtual machine from the external IP address currently assigned thereto.

5. The system of claim 1, wherein the set of routing operations further includes:
coupling the internal IP address of the respective virtual machine to an external IP address from a currently unassigned state.

6. The system of claim 1, wherein the at least one processor executes the stored instructions to further:
map the internal IP addresses of respective virtual machines to respectively assigned external IP addresses.

7. The system of claim 1, wherein the at least one processor executes the stored instructions to further:
map one or more internal ports and respective external IP addresses associated with each of the one or more internal ports with a destination port.

8. The system of claim 1, further comprising:
a database that stores routing information identifying which internal IP addresses are currently routed to which external IP addresses.

9. The system of claim 1, wherein the threshold is a reputation value of the external IP addresses with respect to the e-mail service provider.

10. A method for virtual machine port translation and dynamic routing of a network, the method comprising:
providing a plurality of virtual machines, each virtual machine having an internal IP address that is routable or assignable to one or more external IP addresses shared between the internal IP addresses of the virtual machines;
setting one or more thresholds for each of the external IP addresses based on a policy or constraint set forth by an e-mail service provider, wherein each threshold is a particular number of messages per timeframe;
analyzing a connection state of the network;
determining, based on the analysis, whether any of the external IP addresses meet or exceed the set thresholds; and
performing, based on the determination, a routing operation selected from among the following set of routing operations:
dynamically route the internal IP address of a respective virtual machine to a different external IP address than an external IP address currently assigned thereto, and
defer the dynamic routing.

11. The method of claim 10, wherein the dynamic routing is performed via a firewall, a proxy server, or a reverse proxy server.

12. The method of claim 10, wherein the one or more external IP addresses are connectable to an external network so as to access downstream services of the e-mail service provider.

13. The method of claim 10, wherein the set of routing operations further includes: decoupling the internal IP address of the respective virtual machine from the external IP address currently assigned thereto.

14. The method of claim 10, wherein the set of routing operations further includes: coupling the internal IP address of the respective virtual machine to an external IP address from a currently unassigned state.

15. The method of claim 10, further comprising:
mapping the internal IP addresses of respective virtual machines to respectively assigned external IP addresses.

16. The method of claim 10, further comprising:
mapping one or more internal ports and respective external IP addresses associated with each of the one or more internal ports with a destination port.

17. The method of claim 10, further comprising:
storing routing information identifying which internal IP addresses are currently routed to which external IP addresses.

18. The method of claim 10, wherein the threshold is a reputation value of the external IP addresses with respect to the e-mail service provider.

19. A non-transitory computer readable medium storing executable instructions, the executable instructions, when executed by at least one processor, performs a method for virtual machine port translation and dynamic routing of a network, the method comprising:
providing a plurality of virtual machines, each virtual machine having an internal IP address that is routable or assignable to one or more external IP addresses shared between the internal IP addresses of the virtual machines;
setting one or more thresholds for each of the external IP addresses based on a policy or constraint set forth by an e-mail service provider, wherein each threshold is a particular number of messages per timeframe;
analyzing a connection state of the network;
determining, based on the analysis, whether any of the external IP addresses meet or exceed the set thresholds; and
performing, based on the determination, a routing operation selected from among the following set of routing operations:

dynamically route the internal IP address of a respective virtual machine to a different external IP address than an external IP address currently assigned thereto, and defer the dynamic routing.

* * * * *